United States Patent
Kneckt

(10) Patent No.: US 8,843,629 B2
(45) Date of Patent: Sep. 23, 2014

(54) METHOD, APPARATUS, AND COMPUTER PROGRAM PRODUCT FOR RESPONSE CRITERIA

(75) Inventor: Jarkko Kneckt, Espoo (FI)

(73) Assignee: Nokia Corporation, Palatine, IL (US)

( * ) Notice: Subject to any disclaimer, the term of this patent is extended or adjusted under 35 U.S.C. 154(b) by 271 days.

(21) Appl. No.: 13/470,648

(22) Filed: May 14, 2012

(65) Prior Publication Data

US 2013/0304918 A1  Nov. 14, 2013

(51) Int. Cl.
  *G06F 15/173* (2006.01)
  *H04W 48/16* (2009.01)
  *H04W 8/00* (2009.01)
  *H04W 84/12* (2009.01)

(52) U.S. Cl.
  CPC .............. *H04W 48/16* (2013.01); *H04W 84/12* (2013.01); *H04W 8/005* (2013.01)
  USPC ......................................................... 709/225

(58) Field of Classification Search
  USPC ......................................... 709/225, 227–228
  See application file for complete search history.

(56) References Cited

U.S. PATENT DOCUMENTS

| | | | |
|---|---|---|---|
| 6,643,267 B1 * | 11/2003 | Karia et al. ................. 370/252 |
| 2004/0005894 A1 * | 1/2004 | Trossen et al. ............. 455/436 |
| 2006/0129488 A1 * | 6/2006 | Vincent ........................ 705/50 |
| 2006/0221919 A1 * | 10/2006 | McRae et al. ............... 370/338 |
| 2008/0101241 A1 * | 5/2008 | Mohan et al. ............ 370/236.2 |
| 2008/0227462 A1 * | 9/2008 | Freyman et al. .......... 455/456.1 |
| 2011/0281557 A1 * | 11/2011 | Choi et al. .................. 455/411 |
| 2012/0033568 A1 * | 2/2012 | Park et al. ................... 370/252 |
| 2013/0260731 A1 * | 10/2013 | Vihtari et al. ............... 455/418 |

* cited by examiner

*Primary Examiner* — Joshua Joo
(74) *Attorney, Agent, or Firm* — Locke Lord LLP

(57) ABSTRACT

Method, apparatus, and computer program product embodiments of the invention are disclosed for response criteria employable, for example, in connection with device discovery within wireless networks. In an example embodiment of the invention, a device receives a request that conveys one or more registered unique identifiers that indicate device capabilities. The request conveys response criteria referencing the registered unique identifiers. The device determines recognition of one or more of the referenced registered unique identifiers. The device determines possession of device capabilities indicated by the recognized registered unique identifiers. And, the device determines to dispatch a response to the request that is contingent upon the recognition and the possession.

21 Claims, 6 Drawing Sheets

METHOD, APPARATUS, AND COMPUTER PROGRAM PRODUCT FOR RESPONSE CRITERIA

FIELD

The field of the invention relates to response criteria employable, for example, in connection with device discovery within wireless networks.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth is an example of a short-range wireless technology quickly gaining acceptance in the marketplace. In addition to Bluetooth other popular short-range communication technologies include Bluetooth Low Energy, IEEE 802.11 wireless local area network (WLAN), Wireless USB (WUSB), Ultra Wide-band (UWB), ZigBee (IEEE 802.15.4, IEEE 802.15.4a), and ultra-high frequency radio frequency identification (UHF RFID) technologies. All of these wireless communication technologies have features and advantages that make them appropriate for various applications.

SUMMARY

Method, apparatus, and computer program product embodiments of the invention are disclosed for response criteria employable, for example, in connection with device discovery within wireless networks. In an example embodiment of the invention, a device receives a request that conveys one or more registered unique identifiers that indicate device capabilities. The request conveys response criteria referencing the registered unique identifiers. The device determines recognition of one or more of the referenced registered unique identifiers. The device determines possession of device capabilities indicated by the recognized registered unique identifiers. And, the device determines to dispatch a response to the request that is contingent upon the recognition and the possession.

Method, apparatus, and computer program product embodiments of the invention are disclosed for response criteria employable, for example, in connection with device discovery within wireless networks.

In an example embodiment of the invention, a method comprises:

receiving, at a device, a request, wherein said request conveys one or more registered unique identifiers, wherein the registered unique identifiers indicate device capabilities, and wherein said request conveys response criteria referencing the registered unique identifiers;

determining, at the device, recognition of one or more of the referenced registered unique identifiers;

determining, at the device, possession of device capabilities indicated by the recognized registered unique identifiers; and determining to dispatch, from the device, response to the request, wherein the dispatch is contingent upon the recognition and the possession.

In an example embodiment of the invention, the method further comprises wherein the response criteria include one or more of:

aspects which all need be satisfied in order for the response criteria to be met; and aspects of which only one need be satisfied in order for the response criteria to be met.

In an example embodiment of the invention, the method further comprises wherein the response criteria are conveyed via one or more bit vectors.

In an example embodiment of the invention, the method further comprises wherein the registered unique identifiers are organization unique identifiers.

In an example embodiment of the invention, a method comprises:

formulating, at a device, a request, wherein said request conveys one or more registered unique identifiers, wherein the registered unique identifiers indicate device capabilities, wherein said request conveys response criteria referencing the registered unique identifiers, and wherein the request dictates that response to the request be contingent upon:

recognition of one or more of the referenced registered unique identifiers; and possession of device capabilities indicated by the recognized registered unique identifiers; and determining to dispatch, from the device, the request.

In an example embodiment of the invention, the method further comprises wherein the response criteria include one or more of:

aspects which all need be satisfied in order for the response criteria to be met; and aspects of which only one need be satisfied in order for the response criteria to be met.

In an example embodiment of the invention, the method further comprises wherein the response criteria are conveyed via one or more bit vectors.

In an example embodiment of the invention, the method further comprises wherein parsing of the response criteria includes performance of one or more logical operations.

In an example embodiment of the invention, the method further comprises wherein the registered unique identifiers are organization unique identifiers.

In an example embodiment of the invention, an apparatus comprises:

at least one processor; and at least one memory including computer program code, the at least one memory and the computer program code configured to, with the at least one processor, cause the apparatus at least to perform:

receive, at the apparatus, a request, wherein said request conveys one or more registered unique identifiers, wherein the registered unique identifiers indicate device capabilities, and wherein said request conveys response criteria referencing the registered unique identifiers;

determine, at the apparatus, recognition of one or more of the referenced registered unique identifiers;

determine, at the apparatus, possession of device capabilities indicated by the recognized registered unique identifiers; and determine to dispatch, from the apparatus, response to the request, wherein the dispatch is contingent upon the recognition and the possession.

In an example embodiment of the invention, the apparatus further comprises wherein the response criteria include one or more of:

aspects which all need be satisfied in order for the response criteria to be met; and aspects of which only one need be satisfied in order for the response criteria to be met.

In an example embodiment of the invention, the apparatus further comprises wherein the response criteria are conveyed via one or more bit vectors.

In an example embodiment of the invention, the apparatus further comprises wherein the at least one memory and the computer program code are further configured to, with the at least one processor, cause the apparatus to:

perform one or more logical operations with respect to the response criteria.

In an example embodiment of the invention, the apparatus further comprises wherein the registered unique identifiers are organization unique identifiers.

In an example embodiment of the invention, the apparatus further comprises wherein:

the request is one or more of a probe request and an association request; and/or the response is one or more of a probe response and an association response.

In an example embodiment of the invention, an apparatus comprises:

at least one processor; and at least one memory including computer program code, the at least one memory and the computer program code configured to, with the at least one processor, cause the apparatus at least to perform:

formulate, at the apparatus, a request, wherein said request conveys one or more registered unique identifiers, wherein the registered unique identifiers indicate device capabilities, wherein said request conveys response criteria referencing the registered unique identifiers, and wherein the request dictates that response to the request be contingent upon:

recognition of one or more of the referenced registered unique identifiers; and possession of device capabilities indicated by the recognized registered unique identifiers; and determine to dispatch, from the apparatus, the request.

In an example embodiment of the invention, the apparatus further comprises wherein the response criteria include one or more of:

aspects which all need be satisfied in order for the response criteria to be met; and aspects of which only one need be satisfied in order for the response criteria to be met.

In an example embodiment of the invention, the apparatus further comprises, wherein the response criteria are conveyed via one or more bit vectors.

In an example embodiment of the invention, the apparatus further comprises wherein the registered unique identifiers are organization unique identifiers.

In an example embodiment of the invention, the apparatus further comprises wherein:

the request is one or more of a probe request and an association request; and/or the response is one or more of a probe response and an association response.

In an example embodiment of the invention, a computer program product comprising computer executable program code recorded on a computer readable storage medium, the computer executable program code comprising:

code for causing receipt, at a device, of a request, wherein said request conveys one or more registered unique identifiers, wherein the registered unique identifiers indicate device capabilities, and wherein said request conveys response criteria referencing the registered unique identifiers;

code for causing determination, at the device, of recognition of one or more of the referenced registered unique identifiers;

code for causing determination, at the device, of possession of device capabilities indicated by the recognized registered unique identifiers; and code for causing determination to dispatch, from the device, response to the request, wherein the dispatch is contingent upon the recognition and the possession.

In an example embodiment of the invention, a computer program product comprising computer executable program code recorded on a computer readable storage medium, the computer executable program code comprising:

code for causing formulation, at a device, of a request, wherein said request conveys one or more registered unique identifiers, wherein the registered unique identifiers indicate device capabilities, wherein said request conveys response criteria referencing the registered unique identifiers, and wherein the request dictates that response to the request be contingent upon:

recognition of one or more of the referenced registered unique identifiers; and possession of device capabilities indicated by the recognized registered unique identifiers; and code for causing determination to dispatch, from the device, the request.

In this manner, embodiments of the invention provide response criteria functionality employable, for example, in connection with device discovery within wireless networks.

DISCUSSION OF EXAMPLE EMBODIMENTS OF THE INVENTION

Custom Response Criteria—General Functionality

Exemplary general custom response criteria functionality will now be discussed.

Figure 1:
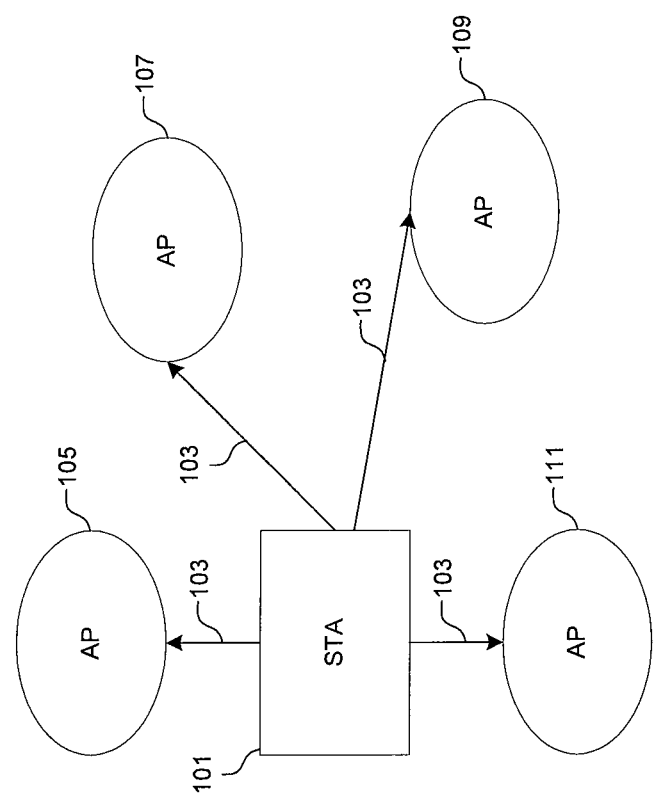
FIG. 1 discloses an exemplary deployment scenario for custom response criteria functionality in accordance with at least one example embodiment of the present invention.

As an illustrative example of such functionality, shown in FIG. 1 is an exemplary deployment scenario for the custom response criteria functionality now discussed. Institute of Electrical and Electronics Engineers (IEEE) 802.11 ai Fast Initial Link Setup (FILS) capable station device (STA) 101 transmits (e.g., broadcasts) probe request 103 which is subsequently received by each of IEEE 802.11ai FILS capable access point devices (APs) 105-111. Probe request 103 includes custom response criteria which it dictates are to be met by a recipient of probe request 103 in order for that recipient to dispatch a corresponding probe response. As such, an AP of APs 105-111 dispatches a responsive probe response only in the case where it meets the custom response criteria. As is discussed in greater detail herein, the custom response criteria included in probe request 103 convey one or more capabilities. Optionally, the custom response criteria included in probe request 103 convey employment of conditional logic (e.g., Boolean logic) with respect to those referenced capabilities. As a non-limiting example, STA 101, a user thereof, and/or software thereof directly and/or indirectly sets the criteria in order to limit responding devices to a desired subset that meet those criteria.

Further according to the illustrative example, the custom response criteria included in probe request 103 correspond to certain software of STA 101, and serve such that STA 101 receives responsive probe response only from—and therefore only discovers—those ones of APs 105-111 that support the software. According to one exemplary implementation, the software is a television (TV) application, and STA 101 is capable of receiving streaming TV programs from APs that support the application. According to another exemplary implementation, the software provides access to cloud services, and STA 101 gets access to data storage (e.g., access to specific data storage) from APs that support the application.

Also according to the illustrative example, suppose the custom response criteria included in probe request 103 instead correspond to a certain agreement (e.g., a subscription) of STA 101, and serve such that STA 101 receives replying probe response only from—and therefore only discovers—those ones of APs 105-111 that respect the agreement. According to an exemplary implementation, the agreement regards roaming, and STA 101 gets network access (e.g., Internet access) from APs that that respect the agreement (e.g., that are covered by a certain roaming contract).

Further according to the illustrative example, it is noted that although, to facilitate illustration by way of example, a STA is discussed as request dispatcher and APs are discussed as response dispatchers, requests discussed herein are dispatchable by STAs and/or APs and responses discussed herein are dispatchable by STAs and/or APs.

Techniques discussed herein are applicable, for example, in facilitating reduction of overhead associated with management frame exchange (e.g., reducing overhead associated with active scanning). In the example of FIG. 1, taking the custom response criteria included in probe request 103 to serve to allow only those probe request recipients supporting certain software to reply to the probe, with employment of the techniques discussed herein only those of APs 105-111 that support the software will respond. In contrast, without employment of the techniques discussed herein each one of APs 105-111 dispatches a probe response in answer to probe request 103, even if that AP does not support the corresponding software. For instance, if the custom response criteria specify requirement that a TV application be supported and only AP 111 supports the TV application, then only a single probe response is transmitted, thus reducing the amount of discovery messages. Such yields a number of potential benefits including facilitating device operation in areas where there are many APs and/or where many STAs are issuing scanning requests.

Custom Response Criteria—Request Functionality

Exemplary custom response criteria request functionality will now be discussed.

Figure 2:
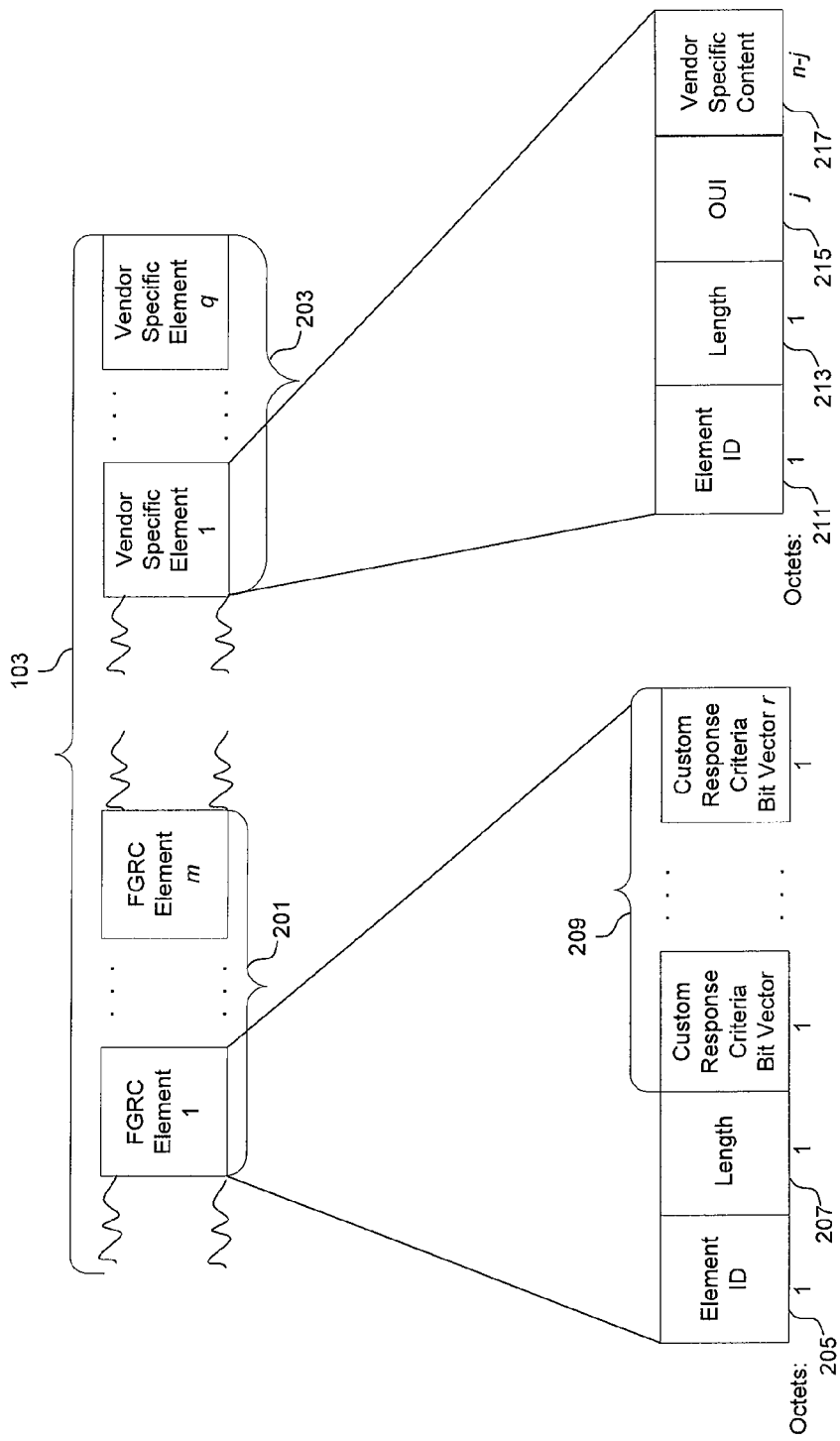
FIG. 2 discloses an exemplary custom response criteria request functionality implementation in accordance with at least one example embodiment of the present invention.

As an illustrative example of such functionality, with reference to FIG. 2, which shows an exemplary custom response criteria request functionality implementation, probe request 103 transmitted by STA 101 includes one or more FILS Generic Response Condition (FGRC) elements 1-$m$ 201 and further includes one or more vendor specific elements 1-$q$ 203. It is noted that "FILS Generic Response Condition (FGRC) element" is merely a non-limiting, exemplary name.

Further according to the illustrative example, included within each of FGRC elements 1-$m$ 201 are element identifier (ID) field 205, length field 207, and one or more Organization Unique Identifier (OUI) custom response criteria bit vector fields 1-$r$ 209. Element ID field 205 is depicted as being one octet in length, length field 207 is depicted as being one octet in length, and each of bit vector fields 1-$r$ 209 is depicted as being one octet in length. Included within each of vendor specific elements 1-$q$ 203 are element ID field 211, length field 213, OUI field 215, and vendor-specific content field 217. Element ID field 211 is depicted as being one octet in length, length field 213 is depicted as being one octet in length, OUI field 215 is depicted as being j octets in length where the value of j is dependent upon the size of the OUI being dispatched, and vendor specific-content field 217 is depicted as being n-j octets in length where the value of n depends upon the amount of vendor specific content being dispatched. It is noted that OUIs as discussed herein are, according to a non-limiting example, IEEE 802.11 OUIs. The IEEE allocates these unique identifiers to entities, including but not limited to manufacturers and organizations, that request them. Moreover, the IEEE registers allocated OUIs in a maintained database. At least portions of this database are accessible by entities (e.g., manufacturers and/or organizations) and/or by devices thereof. The owner of the OUI may use the identifier as it desires and define its own proprietary use of the values.

Additionally according to the illustrative example, as referenced probe request 103 includes one or more vendor specific elements 203, each vendor specific element having a OUI field 215. As such, probe request 103 provides one or more OUI fields 215. Each such OUI field 215 holds an OUI. Such an OUI is interpreted by functionality discussed herein as indicating a capability. Non-limiting examples of such capability include supporting a software application, respecting an agreement (e.g., a subscription), and possessing a feature (e.g., tunneled direct link or another Wi-Fi specified enhancement). As a non-limiting example, element ID field 211 holds the value 221.

Further according to the illustrative example, each set of one or more custom response criteria bit vector fields 1-$r$ 209 conveys a custom response criteria bit vector. Where probe request 103 has more than one FGRC element, probe request 103 has more than one set of custom response criteria bit vector fields 1-r 209 and, as such, probe request 103 holds more than one custom criteria bit vector. The number r of custom response criteria bit vector fields that make up a particular set is dictated by the size of the corresponding bit vector (e.g., in number of bits or octets of bits) and the bit vector field size (e.g., in number of bits or octets of bits), with any unfilled response criteria bit vector field space optionally being set reserved. As a non-limiting example, where the bit vector field size is one octet (i.e., 8 bits) and the size of the corresponding criteria bit vector is 32 bits, r=4. As another non-limiting example, where the bit vector field size is one octet and the size of the corresponding criteria bit vector is 28 bits, it is again the case that r=4 but with the excess four bits being optionally set reserved. Element ID field 205 is set to a unique value indicating the FGRC element. Length field 207 is set to the number of units (e.g., octets) that the one or more OUI response criteria bit vector fields 1-r 209 consume.

Still further according to the illustrative example, each of the one or more OUI fields conveyed by probe request 103 holds a OUI which is interpreted as indicating a capability. Each of the one or more custom response criteria bit vectors references those OUI-indicated capabilities in a sequential fashion. The first bit (e.g., bit 0) of the bit vector references the first OUI included in probe request 103. Likewise, where probe request 103 includes a second OUI the second bit (e.g., bit 1) of the bit vector references that second OUI included in probe request 103. Likewise holds with respect to the remaining OUIs included in probe request 103 such that the gth bit of the bit vector refers to the gth OUI in probe request 103.

Additionally according to the illustrative example, the custom response criteria set forth criteria that are to be met by a device receiving those criteria in order to dispatch a corresponding response. A device, a user thereof, and/or software thereof, according to non-limiting examples, directly and/or indirectly set the criteria in order to limit responding devices to a desired subset that meet the criteria. The custom response criteria are set via choice of bit value for each bit position of each of the one or more custom response criteria bit vectors (e.g., direct and/or indirect choice by STA 101, software thereof, and/or a user thereof). Choice of bit value reflects the parsing performed by a device receiving a custom response criteria bit vector (e.g., an AP of APs 105-111 receiving the bit vector via probe request 103) in determining whether or not to dispatch a reply thereto (e.g., whether or not a responsive probe response should be dispatched to STA 101). The recipient device parses as follows. In the case where a particular custom response criteria bit vector specifies a value of 0 with respect to a OUI in probe request 103 (e.g., where the first bit of the bit vector, which references the first OUI in probe request 103, is set to 0) the recipient device need not consider the corresponding OUI nor any capability to which the OUI maps. According to one exemplary implementation, the recipient device resolves this position of the bit vector to true. According to another exemplary implementation, the recipient device ignores this position of the bit vector in subsequent operations regarding the bit vector (e.g., ignores it in subsequent Boolean operations).

Further according to the illustrative example, in the case where the custom response criteria bit vector specifies a value of 1 with respect to a OUI in probe request 103 (e.g., where the first bit of the bit vector, which references the first OUI in probe request 103, is set to 1) the recipient device resolves this position of the bit vector to true in the case where two conditions are met, and otherwise resolves this position of the bit vector to false. The first condition is that the recipient device recognize the OUI. As a non-limiting example, a device does not recognize a particular OUI in the case where the OUI corresponds to a first manufacturer and/or organization but the device is of a second manufacturer and/or organization. The second condition, which is optionally considered only where the device does recognize the OUI, is that the device has the capability indicated by the OUI. As a non-limiting example, in the case where the OUI indicates tunneled direct link, the device has the capability where is possesses the tunneled direct link feature.

Still further according to the illustrative example, having so parsed with respect to each bit position of the bit vector, the recipient device continues parsing by, and acts to resolve the bit vector as a whole. In so resolving the bit vector as a whole, the recipient device performs a Boolean AND operation upon the results of the per bit position parsing of the bit vector. As a non limiting example, in the case where the results of the per bit position parsing of the bit vector are [true, true, false] the bit vector as a whole resolves to false.

Additionally according to the illustrative example, where probe request 103 has more than one FGRC element, probe request 103 holds more than one custom criteria bit vector. In the case of multiple custom criteria bit vectors, the recipient device performs a Boolean OR operation upon the results of the per bit vector parsing. As a non-limiting example, where the results of the per bit vector parsing are [false, true, false] the set of bit vectors carried by probe request 103, as whole, resolves to true. As a further non-limiting example, the set of bit vectors carried by probe request 103 as whole is considered a bit matrix.

Custom Response Criteria—Response Functionality

Exemplary custom response criteria response functionality will now be discussed.

Figure 3:
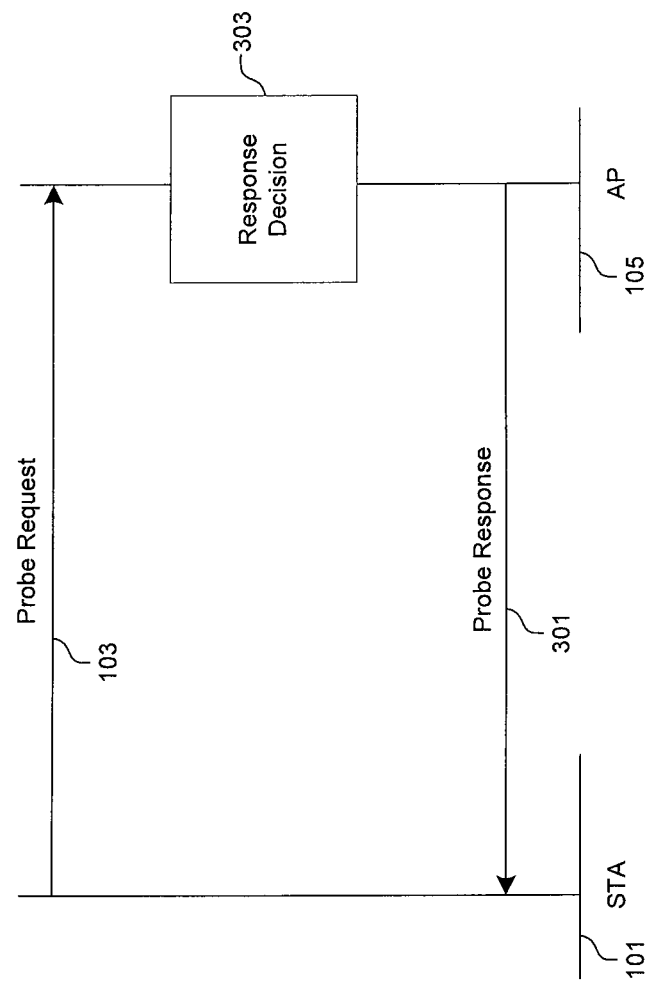
FIG. 3 discloses an exemplary custom response criteria response functionality implementation in accordance with at least one example embodiment of the present invention.

As an illustrative example of such functionality, with reference to FIG. 3, which shows an exemplary custom response criteria response functionality implementation, AP 105 dispatches probe response 301 in answer to probe request 103 dispatched by STA 101 in the case where response decision 303 finds that the custom response criteria included in probe request 103 are met, and otherwise does not dispatch probe response 301. Although AP 105 is discussed so as to facilitate illustration by way of example, the exemplary functionality discussed herein in connection with AP 105 is applicable to any of APs 105-111.

Figure 4:
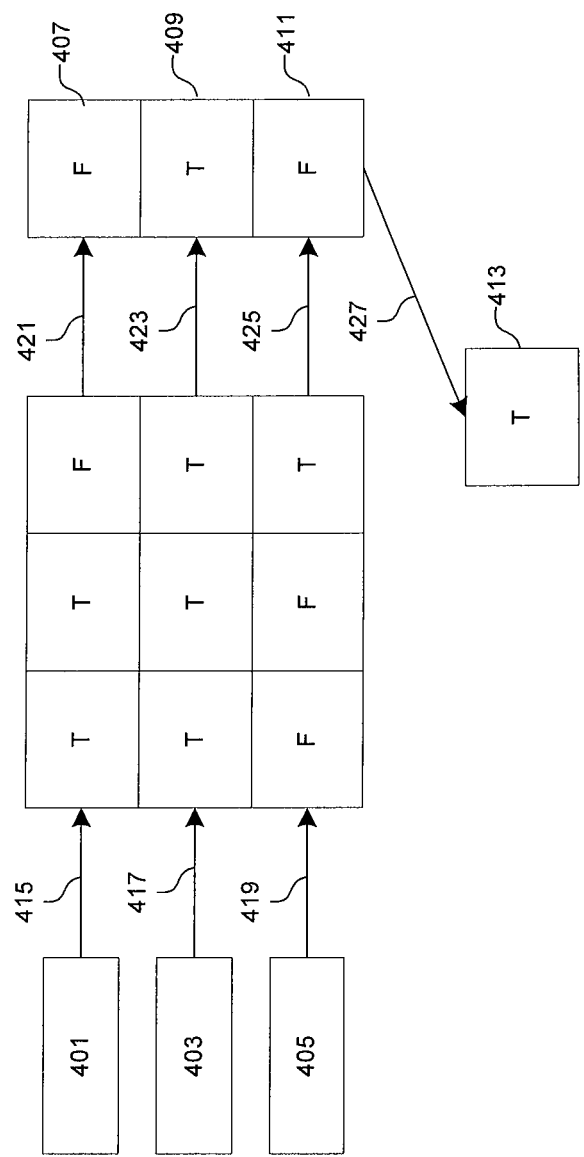
FIG. 4 discloses further exemplary custom response criteria response functionality implementation in accordance with at least one example embodiment of the present invention.

Further according to the illustrative example, with reference to FIG. 4, which shows further exemplary custom response criteria response functionality implementation, AP 105 has, by virtue of probe request 103 having more than one FGRC element, received via probe request 103 multiple custom criteria bit vectors 401-405. As a non-limiting example, STA 101 dispatches multiple FGRC elements via probe request 103 in that case where STA 101 is running multiple applications. In performing response decision 303 AP 105 performs per bit position parsing and subsequent per bit vector parsing of each of custom response criteria bit vectors 401-405. The details of such per bit position parsing and subsequent per bit vector parsing are discussed also hereinabove in connection with exemplary custom response criteria request functionality. The per bit position parsing 415 and subsequent per bit vector parsing 421 by AP 105 yields result 407 with respect to bit vector 401. The per bit vector parsing 421 of bit vector 401 includes performing a Boolean AND operation upon [true, true, false] yielding false for result 407. The per bit position parsing 417 and subsequent per bit vector parsing 423 by AP 105 yields result 409 with respect to bit vector 403. The per bit vector parsing 423 of bit vector 403 involves performing a Boolean AND operation upon [true, true, true] yielding true for result 409. The per bit position parsing 419 and subsequent per bit vector parsing 425 by AP 105 yields result 411 with respect to bit vector 405. The per bit vector parsing 425 of bit vector 405 involves performing a Boolean AND operation upon [false, false, true] yielding false for result 411.

Still further according to the illustrative example, in performing response decision 303 AP 105 performs parsing 427 with respect to the set of custom response criteria bit vectors carried by probe request 103 as a whole. The details of such parsing are discussed also hereinabove in connection with exemplary custom response criteria request functionality. Such parsing 427 by AP 105 yields result 413. The parsing 427 includes performing a Boolean OR operation upon [false, true, false] yielding true for result 413. As noted, as a non-limiting example the set of custom response criteria bit vectors carried by probe request 103 as whole is considered a bit matrix.

Additionally according to the illustrative example, having found the set of custom response criteria bit vectors carried by probe request 103, as a whole, to resolve to true, the exemplary outcome of response decision 303 is AP 105 electing to dispatch probe response 301. Had AP 105 instead found the set of bit vectors carried by probe request 103, as a whole, to resolve to false, AP would have elected to not dispatch probe response 301. It is noted that, as a non-liming example, AP 105, in view of having received multiple custom criteria bit vectors, combines corresponding response to a single probe response frame. Probe response 301 optionally includes one or more vendor specific elements including OUI fields. Via these OUI fields AP 105 optionally specifies one or more of its capabilities. According to an exemplary implementation AP 105 specifies those possessed capabilities which were referenced in the OUIs that it received via probe request 103. According to another exemplary limitation AP 105 also specifies further possessed capabilities. Receiving probe response 301 STA 101 optionally considers the OUIs included in probe response 301 in light of the OUIs included in probe request 103 so as to determine which capabilities of interest to STA 101, software thereof, and/or a user thereof are possessed by AP 105.

Although to facilitate illustration by way of example referencing of OUIs has been discussed in terms custom response criteria bit vectors, according to an exemplary implementation a FGRC instead includes the OUI values themselves. Further, although so as to facilitate illustration by way of example bit vector field size has been discussed as being one octet in size, according to an exemplary implementation the field size is other than one octet in size. According to another exemplary implementation the field size is configurable.

Also, although, so as to facilitate illustration by way of example, the requests and responses discussed herein have been discussed in terms of probe requests and probe responses, according to an exemplary implementation other than probe requests and probe responses are employed including other requests and/or responses that include vendor specific elements (e.g., association requests, association responses, Generic Advertisement Service (GAS) query initiation requests, GAS query responses, other management requests, and/or other management responses).

Still further, although so as to facilitate illustration by way of example discussion has been of a recipient dispatching response in the case where it meets custom response criteria and otherwise not dispatching response, according to an exemplary implementation the recipient dispatches response in the case of failing to meet the custom response criteria but includes in the response a failure code (e.g., a failure status code) and/or dispatches response in the case of meeting the custom response criteria and includes in the response a success code (e.g., a success status code).

Additionally, although so as to facilitate illustration by way of example OUIs have been discussed, other identifiers are employable. Such identifiers other than OUIs that are employable in connection with that which is discussed herein include but are not limited to identifiers that are allocated, unique, and/or registered. Such registration is, as a non-limiting example, registration in a database accessible by manufacturers, organizations, and/or other entities.

Example embodiments of the invention include an apparatus, comprising:

means for receiving, at a device, a request, wherein said request conveys one or more registered unique identifiers, wherein the registered unique identifiers indicate device capabilities, and wherein said request conveys response criteria referencing the registered unique identifiers;

means for determining, at the device, recognition of one or more of the referenced registered unique identifiers;

means for determining, at the device, possession of device capabilities indicated by the recognized registered unique identifiers; and means for determining to dispatch, from the device, response to the request, wherein the dispatch is contingent upon the recognition and the possession.

Example embodiments of the invention further include an apparatus comprising:

means for formulating, at a device, a request, wherein said request conveys one or more registered unique identifiers, wherein the registered unique identifiers indicate device capabilities, wherein said request conveys response criteria referencing the registered unique identifiers, and wherein the request dictates that response to the request be contingent upon:

recognition of one or more of the referenced registered unique identifiers; and possession of device capabilities indicated by the recognized registered unique identifiers; and means for determining to dispatch, from the device, the request.

Hardware and Software

The foregoing discusses computers, such as the discussed devices, performing a number of operations. Exemplary computers include smart cards, media devices, personal computers, engineering workstations, PCs, Macintoshes, PDAs, portable computers, computerized watches, wired and wireless terminals, telephones, communication devices, nodes servers, network access points, network multicast points, network devices, set-top boxes, personal video recorders (PVRs), game consoles, portable game devices, portable audio devices, portable media devices, portable video devices, televisions, digital cameras, digital camcorders, Global Positioning System (GPS) receivers, wireless personal servers.

Running on such computers are often one or more operating systems. Exemplary operating systems include Windows Phone (e.g., Windows Phone 7), Windows (e.g., Windows 8, Windows 7, or Windows Vista), Windows Server (e.g., Windows Server 8, Windows server 2008, or Windows Server 2003), Maemo, Symbian OS, WebOS, Linux, OS X, and iOS. Supported by optionally such computers are one or more of the S60 Platform, the .NET Framework, Java, and Cocoa.

Exemplary computers also include one or more processors operatively connected to one or more memory or storage units, wherein the memory or storage optionally contains data, algorithms, and/or program code, and the processor or processors execute the program code and/or manipulate the program code, data, and/or algorithms.

Figure 5:
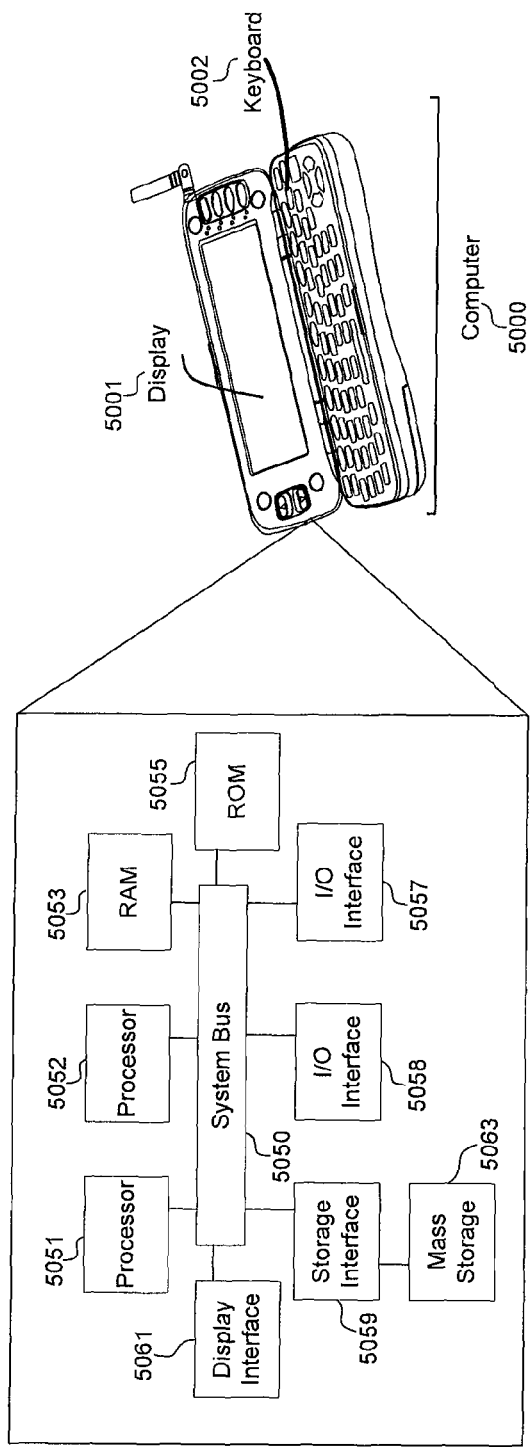
FIG. 5 discloses an exemplary computer in accordance with at least one example embodiment of the present invention.

FIG. 5 shows exemplary computer 5000 including system bus 5050 which operatively connects two processors 5051 and 5052, random access memory 5053, read-only memory 5055, input output (I/O) interfaces 5057 and 5058, storage interface 5059, and display interface 5061. Storage interface 5059 in turn connects to mass storage 5063. Each of I/O interfaces 5057 and 5058 is an Ethernet, IEEE 1394, IEEE 1394b, IEEE 802.11a, 802.11af, IEEE 802.11b, IEEE 802.11g, IEEE 802.11i, IEEE 802.11e, IEEE 802.11n, IEEE 802.11ac, IEEE 802.15a, IEEE 802.16a, IEEE 802.16d, IEEE 802.16e, IEEE 802.16m, IEEE 802.16x, IEEE 802.20, IEEE 802.22, IEEE 802.15.3, ZigBee (e.g., IEEE 802.15.4), Bluetooth (e.g., IEEE 802.15.1), Ultra Wide Band (UWB), Wireless Universal Serial Bus (WUSB), wireless Firewire, terrestrial digital video broadcast (DVB-T), satellite digital video broadcast (DVB-S), Advanced Television Systems Committee (ATSC), Integrated Services Digital Broadcasting (ISDB), Digital Multimedia Broadcast-Terrestrial (DMB-T), MediaFLO (Forward Link Only), Terrestrial Digital Multimedia Broadcasting (T-DMB), Digital Audio Broadcast (DAB), Digital Radio Mondiale (DRM), General Packet Radio Service (GPRS), Universal Mobile Telecommunications Service (UMTS), Long Term Evolution (LTE), Global System for Mobile Communications (GSM), Code Division Multiple Access 2000 (CDMA2000), DVB-H (Digital Video Broadcasting: Handhelds), HDMI (High-Definition Multimedia Interface), Thunderbolt, or IrDA (Infrared Data Association) interface.

Further according to FIG. 5 mass storage 5063 is a hard drive or flash memory. Each of processors 5051 and 5052 is an ARM-based processor such as a Qualcomm Snapdragon or an x86-based processor such as an Intel Atom or Intel Core. Computer 5000 as shown in this example also includes a touch screen 5001 and physical keyboard 5002. Optionally a mouse or keypad is alternately or additionally employed. Moreover, physical keyboard 5002 is optionally eliminated.

Additionally according to FIG. 5 computer 5000 optionally includes or is attached to one or more image capture devices. Exemplary image capture devices include ones employing Complementary Metal Oxide Semiconductor (CMOS) hardware and ones employing Charge Coupled Device (CCD) hardware. One or more of the image capture devices are according to one exemplary implementation aimed towards the user. Alternately or additionally, one or more of the image capture devices are aimed away from the user. The one or more image capture devices are optionally employed by computer 5000 for video conferencing, still image capture, and/or video capture. Moreover, computer 5000 optionally includes or is attached to one or more card readers, DVD drives, floppy disk drives, hard drives, memory cards, or ROM devices whereby media containing program code—such as program code for performing the discussed operations—is optionally inserted for the purpose of loading the code onto the computer. Further, program code—such as program code for performing the discussed operations—is optionally loaded the code onto the computer via one or more of I/O interfaces 5057 and 5058, perhaps using one or more networks.

According to an exemplary implementation, executed by computers discussed herein are one or more software modules designed to perform one or more of the discussed operations. Such modules are programmed using one or more languages. Exemplary languages include C#, C, C++, Objective C, Java, Perl, and Python. Corresponding program code is optionally placed on media. Exemplary media include DVD, CD-ROM, memory card, and floppy disk.

Any indicated division of operations among particular software modules is for purposes of illustration, and alternate divisions of operation are possible. Accordingly, any operations indicated to be performed by one software module are according to an alternative implementation instead performed by a plurality of software modules. Similarly, any operations indicated to be performed by a plurality of modules are according to an alternative implementation instead be performed by a single module.

Further, any operations indicated to be performed by a particular computer such as a particular device are according to an alternative implementation instead performed by a plurality of computers such as by a plurality of devices. Moreover, peer-to-peer, cloud, and/or grid computing techniques are optionally employed. Additionally, implementations include remote communication among software modules. Exemplary remote communication techniques include Simple Object Access Protocol (SOAP), Java Messaging Service (JMS), Remote Method Invocation (RMI), Remote Procedure Call (RPC), sockets, and pipes.

Optionally, operations discussed herein are implemented via hardware. Examples of such implementation via hardware include the use of one or more of integrated circuits, specialized hardware, chips, chipsets, Application-Specific Integrated Circuits (ASICs), and Field-Programmable Gate Arrays (FPGAs). As a non-limiting example such hardware is programed to perform operations discussed herein using one or more languages such as one or more Hardware Description Languages (HDLs). Exemplary HDLs include very-high-speed integrated circuit hardware description language (VDHL) and Verilog.

Figure 6:
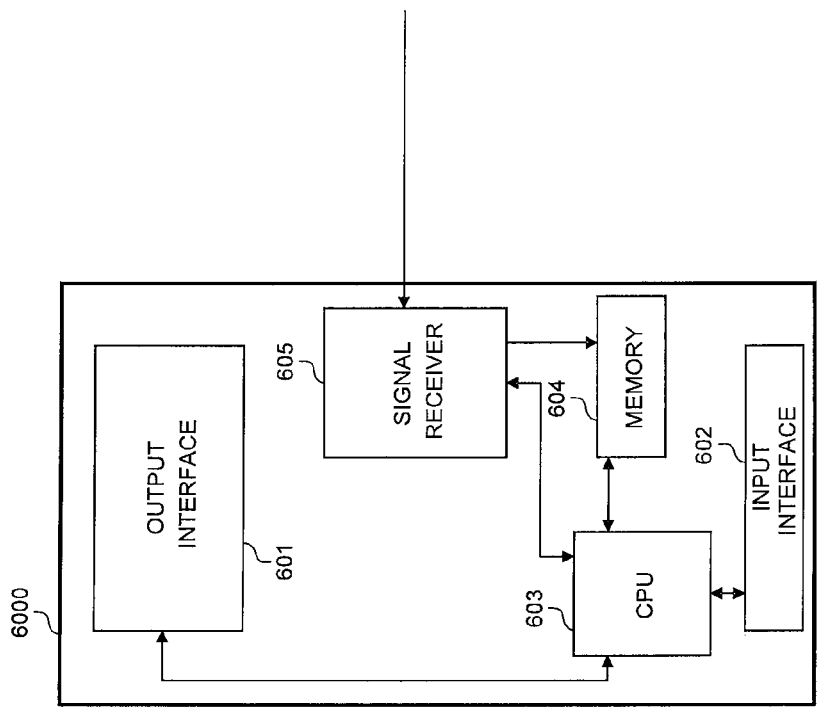
FIG. 6 discloses a further exemplary computer in accordance with at least one example embodiment of the present invention.

As noted, the foregoing discusses computers such as the discussed devices. Shown in FIG. 6 is a block diagram of a further exemplary computer, terminal 6000. Exemplary terminal 6000 of FIG. 6 includes a processing unit CPU 603, a signal receiver 605, and a user interface (601, 602). Examples of signal receiver 605 include single-carrier and multi-carrier receivers. Signal receiver 605 and the user interface (601, 602) are coupled with the processing unit CPU 603. One or more direct memory access (DMA) channels exist between multi-carrier signal terminal part 605 and memory 604. The user interface (601, 602) includes a display and a keyboard that enable a user to use the terminal 6000. In addition, the user interface (601, 602) includes a microphone and a speaker for receiving and producing audio signals. The user interface (601, 602) optionally employs voice recognition.

The processing unit CPU 603 a microprocessor (not shown), memory 604, and optionally software. The software is stored in the memory 604. The microprocessor controls, on the basis of the software, the operation of the terminal 6000, such as receiving of a data stream, tolerance of the impulse burst noise in data reception, displaying output in the user interface and the reading of inputs received from the user interface. The hardware contains circuitry for detecting signal, circuitry for demodulation, circuitry for detecting impulse, circuitry for blanking those samples of the symbol where significant amount of impulse noise is present, circuitry for calculating estimates, and circuitry for performing the corrections of the corrupted data.

Still referring to FIG. 6, middleware or software implementation is optionally applied. Examples of terminal 6000 include a hand-held device such as a cellular mobile phone which includes the multi-carrier signal terminal part 605 for receiving multicast transmission streams. Therefore, the terminal 6000 optionally interacts with service providers.

Ramifications and Scope

Although the description above contains many specifics, these are merely provided to illustrate the invention and should not be construed as limitations of the invention's scope. For instance, various examples are articulated herein via the discussion of certain aspects. Such aspects are, themselves, merely exemplary and should not be construed as limitations of the invention's scope. Thus it will be apparent to those skilled in the art that various modifications and variations are applicable to the system and processes of the present invention without departing from the spirit or scope of the invention.

In addition, the embodiments, features, methods, systems, and details of the invention that are described above in the application are combinable separately or in any combination to create or describe new embodiments of the invention.

What is claimed is:

1. A method, comprising:
    receiving, at a device, a request, wherein said request conveys one or more registered unique identifiers, wherein the registered unique identifiers are organization unique identifiers, wherein the registered unique identifiers indicate device capabilities, and wherein said request conveys organization unique identifier response criteria referencing the one or more registered unique identifiers;
    determining, at the device, whether the device recognizes one or more of the referenced one or more registered identifiers;
    determining, at the device, possession of device capabilities indicated by the one or more registered unique identifiers, if the device recognized the one or more registered identifiers;
    determining, by the device, whether or not to send a response to the request, wherein the response to the request is contingent upon the recognition and the possession; and
    not responding to the request if the device does not recognize one or more of the organization unique identifiers in the request.

2. The method of claim 1, wherein the organization unique identifier response criteria include one or more of:
    aspects which all need be satisfied in order for the response criteria to be met; and
    aspects of which only one need be satisfied in order for the response criteria to be met.

3. The method of claim 1, wherein the organization unique identifier response criteria are conveyed via one or more bit vectors.

4. The method of claim 1, further comprising:
    not responding to the request if the device does not possess the organization unique identifiers.

5. A method, comprising:
    formulating, at a device, a request, wherein said request conveys one or more registered unique identifiers, wherein the registered unique identifiers are organization unique identifiers, wherein the registered unique identifiers indicate device capabilities, wherein said request conveys organization unique identifier response criteria referencing the one or more registered unique identifiers, and wherein the request dictates that a receiver of the request determine whether or not to send a response to the request, wherein the response to the request be contingent upon:
        recognition of one or more of the referenced one or more registered unique identifiers; and
        possession of device capabilities indicated by the recognized one or more registered unique identifiers; and
    determining to dispatch, from the device, the request.

6. The method of claim 5, wherein the organization unique identifier response criteria include one or more of:
    aspects which all need be satisfied in order for the response criteria to be met; and
    aspects of which only one need be satisfied in order for the response criteria to be met.

7. The method of claim 5, wherein the organization unique identifier response criteria are conveyed via one or more bit vectors.

8. The method of claim 5, further comprising:
    parsing of the organization unique identifier response criteria to include performance of one or more logical operations.

9. An apparatus, comprising:
    at least one processor; and
    at least one memory including computer program code, the at least one memory and the computer program code configured to, with the at least one processor, cause the apparatus at least to perform:
    receive, at the apparatus, a request, wherein said request conveys one or more registered unique identifiers, wherein the registered unique identifiers are organization unique identifiers, wherein the registered unique identifiers indicate device capabilities, and wherein said request conveys organization unique identifier response criteria referencing the one or more registered unique identifiers;
    determine, at the apparatus, whether the apparatus recognizes one or more of the referenced one or more registered unique identifiers;
    determine, at the apparatus, possession of device capabilities indicated by the one or more registered unique identifiers, if the apparatus recognized the one or more registered identifiers;
    determine, by the apparatus, whether or not to send a response to the request, wherein the response to the request is contingent upon the recognition and the possession; and
    to not respond to the request if the apparatus does not recognize one or more of the organization unique identifiers in the request.

10. The apparatus of claim 9, wherein the organization unique identifier response criteria include one or more of:
    aspects which all need be satisfied in order for the response criteria to be met; and
    aspects of which only one need be satisfied in order for the response criteria to be met.

11. The apparatus of claim 9, wherein the organization unique identifier response criteria are conveyed via one or more bit vectors.

12. The apparatus of claim 9, wherein the at least one memory and the computer program code are further configured to, with the at least one processor, cause the apparatus to:
    perform one or more logical operations with respect to the organization unique identifier response criteria.

13. The apparatus of claim 9, wherein:
    the request is one or more of a probe request and an association request; and/or
    the response is one or more of a probe response and an association response.

14. The apparatus of claim 9, further comprising:
    the at least one memory and the computer program code configured to, with the at least one processor, cause the apparatus at least to perform:

to not respond to the request if the apparatus does not possess the organization unique identifiers.

15. An apparatus, comprising:
   at least one processor; and
   at least one memory including computer program code, the at least one memory and the computer program code configured to, with the at least one processor, cause the apparatus at least to perform:
      formulate, at the apparatus, a request, wherein said request conveys one or more registered unique identifiers, wherein the registered unique identifiers are organization unique identifiers, wherein the registered unique identifiers indicate device capabilities, wherein said request conveys organization unique identifier response criteria referencing the one or more registered unique identifiers, and wherein the request dictates that a receiver of the request determine whether or not to send a response to the request, wherein the response to the request be contingent upon:
         recognition of one or more of the referenced one or more registered unique identifiers; and
         possession of device capabilities indicated by the recognized one or more registered unique identifiers; and
      determine to dispatch, from the apparatus, the request.

16. The apparatus of claim 15, wherein the organization unique identifier response criteria include one or more of:
   aspects which all need be satisfied in order for the response criteria to be met; and
   aspects of which only one need be satisfied in order for the response criteria to be met.

17. The apparatus of claim 15, wherein the organization unique identifier response criteria are conveyed via one or more bit vectors.

18. The apparatus of claim 15, wherein:
   the request is one or more of a probe request and an association request; and/or
   the response is one or more of a probe response and an association response.

19. A computer program product comprising computer executable program code recorded on a non-transitory computer readable storage medium, the computer executable program code comprising:
   code for causing receipt, at a device, of a request, wherein said request conveys one or more registered unique identifiers, wherein the registered unique identifiers are organization unique identifiers, wherein the registered unique identifiers indicate device capabilities, and wherein said request conveys organization unique identifier response criteria referencing the one or more registered unique identifiers;
   code for causing determination, at the device, whether the device recognizes one or more of the referenced one or more registered unique identifiers;
   code for causing determination, at the device, of possession of device capabilities indicated by the one or more registered unique identifiers, if the device recognized the one or more registered identifiers;
   code for causing determination, by the device, whether or not to send a response to the request, wherein the response to the request is contingent upon the recognition and the possession; and
   code for not responding to the request if the device does not recognize one or more of the organization unique identifiers in the request.

20. The computer program product of claim 19, further comprising:
   code for not responding to the request if the device does not possess the organization unique identifiers.

21. A computer program product comprising computer executable program code recorded on a non-transitory computer readable storage medium, the computer executable program code comprising:
   code for causing formulation, at a device, of a request, wherein said request conveys one or more registered unique identifiers, wherein the registered unique identifiers are organization unique identifiers, wherein the registered unique identifiers indicate device capabilities, wherein said request conveys organization unique identifier response criteria referencing the one or more registered unique identifiers, and wherein the request dictates that a receiver of the request determine whether or not to send a response to the request, wherein the response to the request be contingent upon:
      recognition of one or more of the referenced one or more registered unique identifiers; and
      possession of device capabilities indicated by the recognized one or more registered unique identifiers; and
   code for causing determination to dispatch, from the device, the request.

* * * * *